Figure 1:
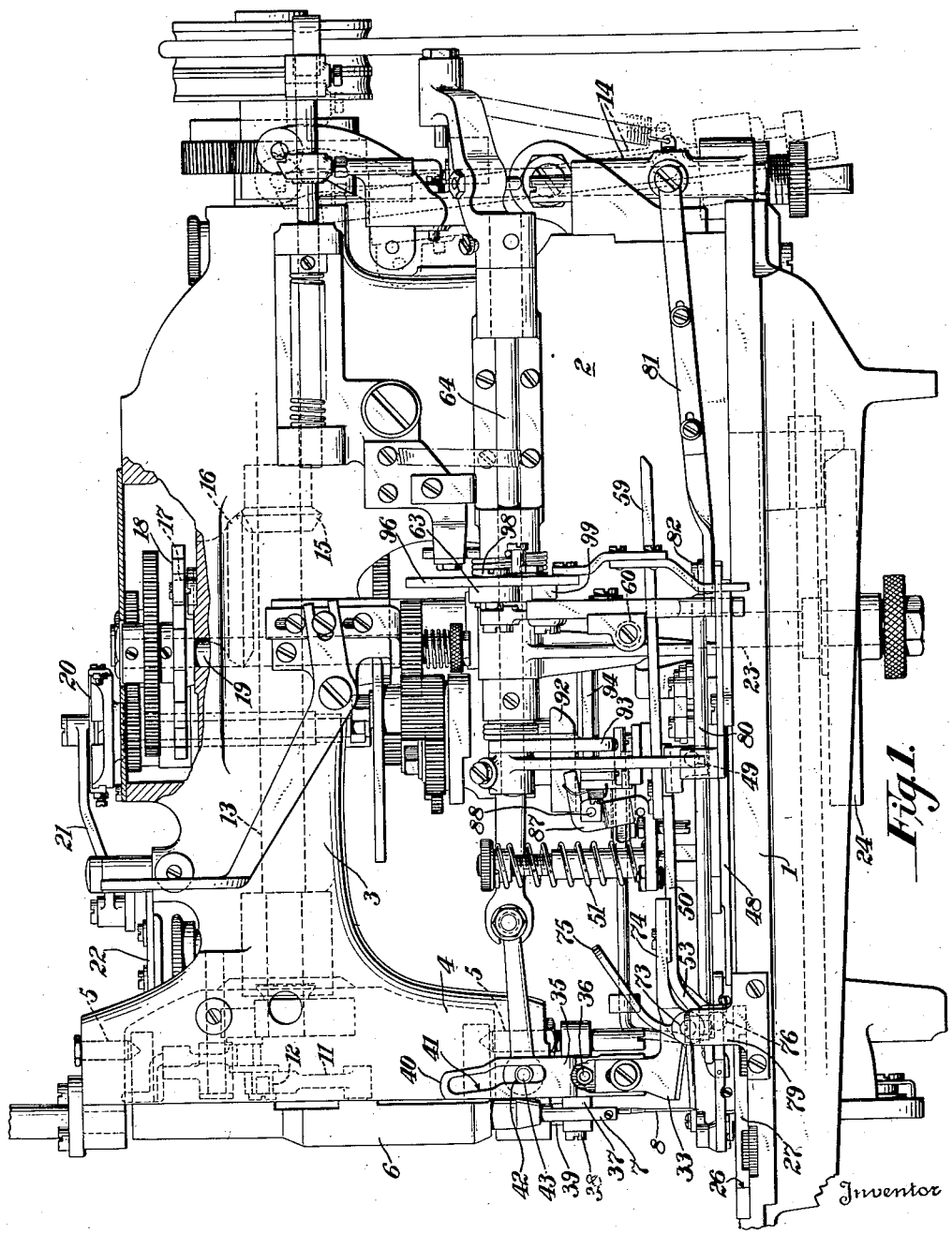

Dec. 30, 1941.    A. R. WOOD    2,268,367
STRETCHING WORK CLAMP FOR SEWING MACHINES
Filed May 18, 1940    6 Sheets-Sheet 1

Witness:
John H. Cave

Inventor
Alfred R. Wood
By John F. Heine
Attorney

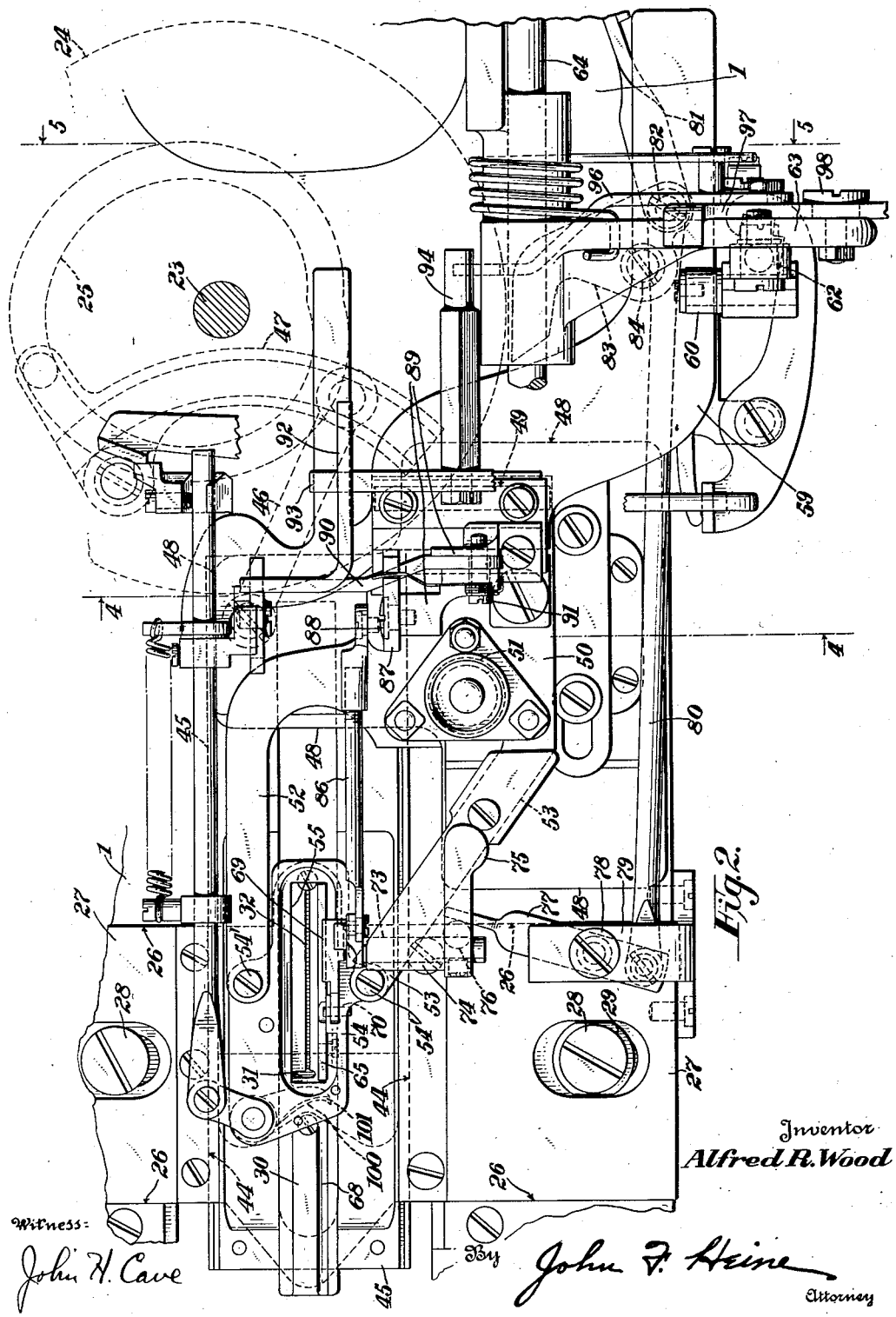

Dec. 30, 1941. A. R. WOOD 2,268,367
STRETCHING WORK CLAMP FOR SEWING MACHINES
Filed May 18, 1940 6 Sheets-Sheet 3
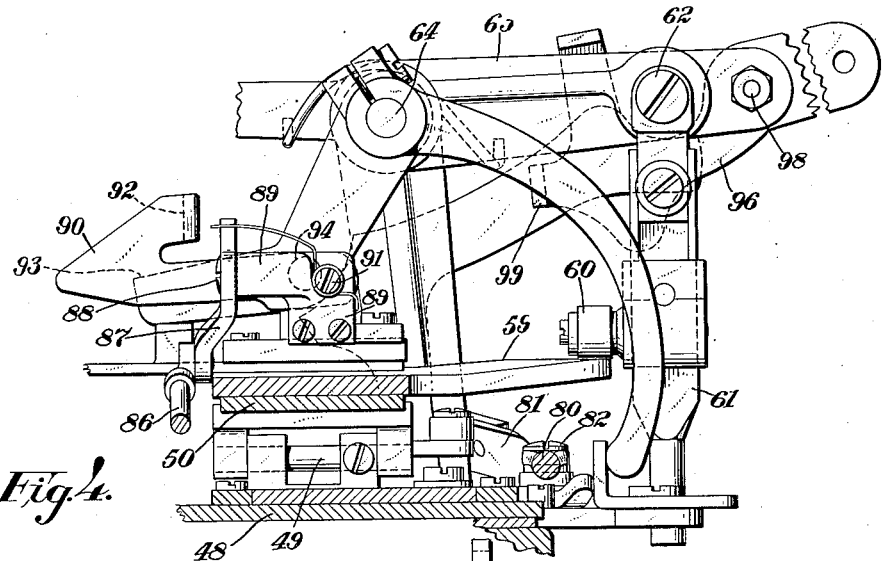
Fig.4.
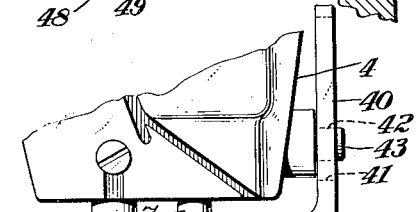
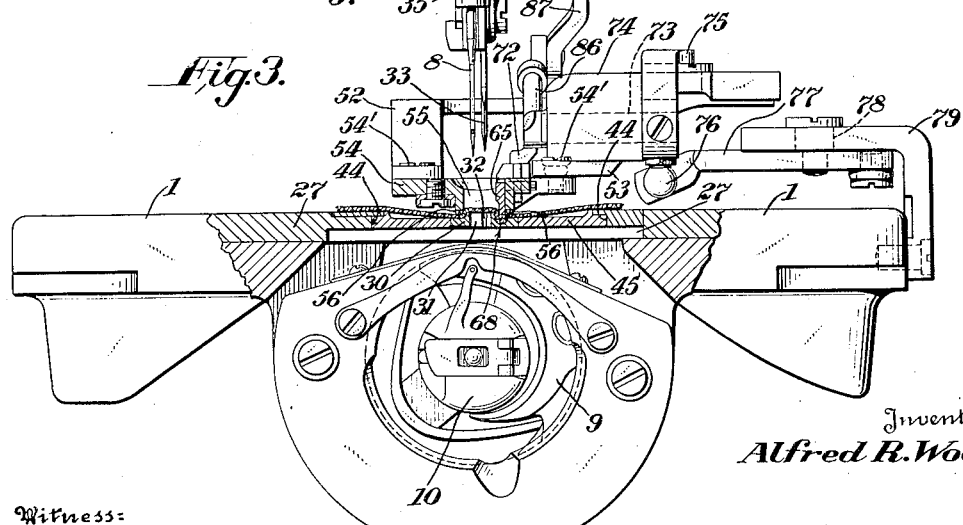
Fig.3.
Inventor
Alfred R. Wood
Witness:
John H. Cave
By John F. Heine
Attorney Dec. 30, 1941.  A. R. WOOD  2,268,367
STRETCHING WORK CLAMP FOR SEWING MACHINES
Filed May 18, 1940  6 Sheets-Sheet 4
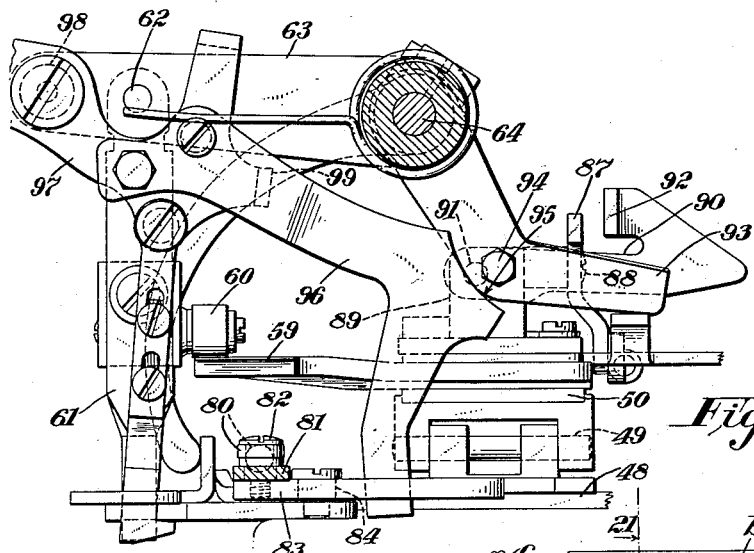
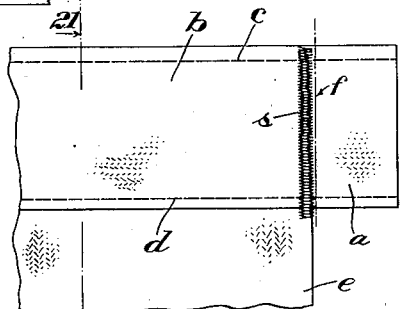
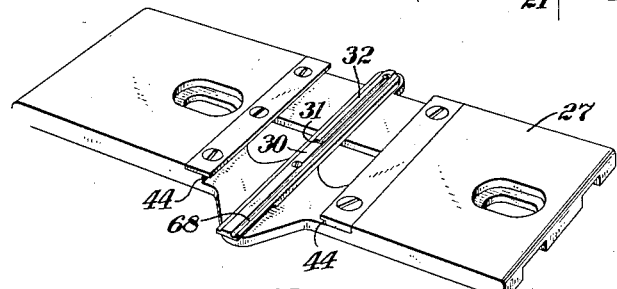
Inventor
Alfred R. Wood
Witness:
John H. Cave
By John F. Heine
Attorney Dec. 30, 1941.    A. R. WOOD    2,268,367
STRETCHING WORK CLAMP FOR SEWING MACHINES
Filed May 18, 1940    6 Sheets-Sheet 5
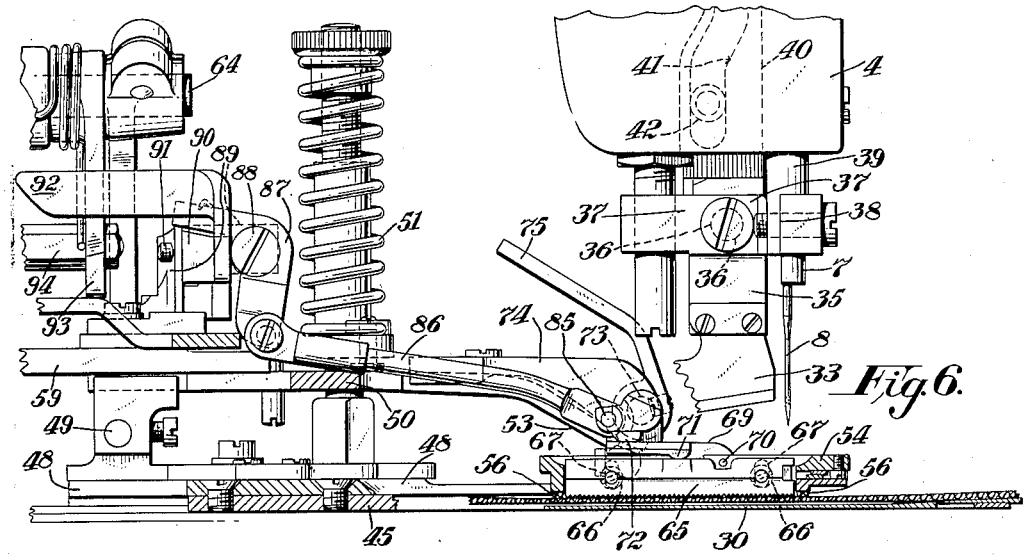
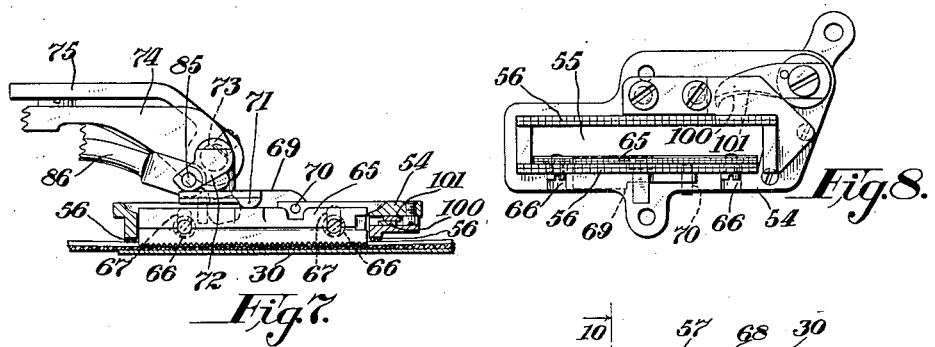
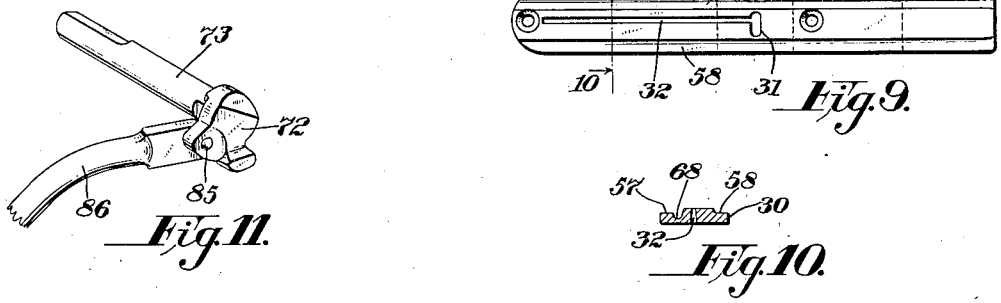
Inventor
Alfred R. Wood
Witness:
John N. Cave
By John F. Heine
Attorney

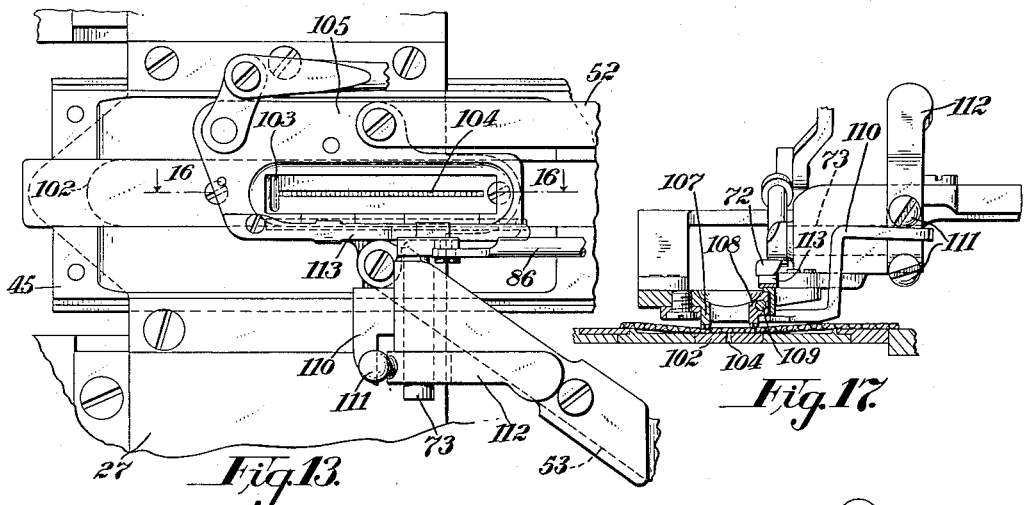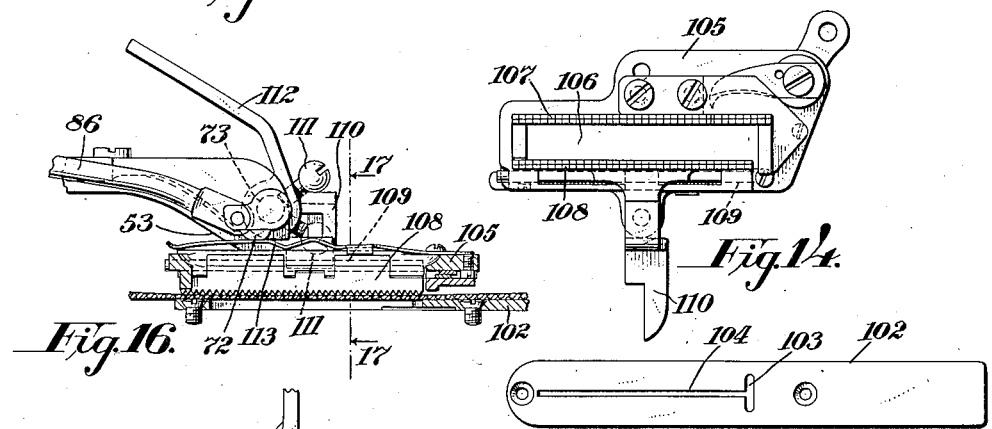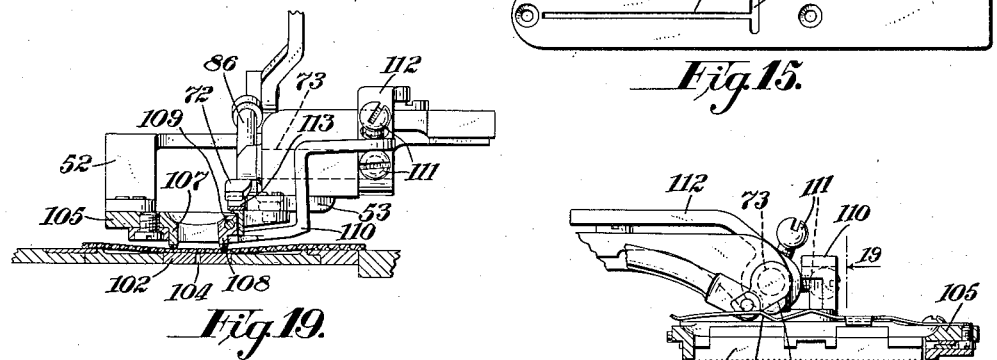

Patented Dec. 30, 1941

2,268,367

UNITED STATES PATENT OFFICE 2,268,367

STRETCHING WORK CLAMP FOR SEWING MACHINES

Alfred R. Wood, Bridgeport, Conn., assignor to The Singer Manufacturing Company, Elizabeth, N. J., a corporation of New Jersey Application May 18, 1940, Serial No. 335,935

12 Claims. (Cl. 112—74)

This invention relates to sewing machines, more particularly of the type having stitch-forming mechanism and a work-clamp with means for relatively moving them to sew a predetermined group of stitches; the stitch-forming mechanism coming to rest automatically after the predetermined group of stitches has been sewn in the work. Machines of this type are commonly used for tacking and barring operations, buttonholing, etc.

In machines of the type in question it is common to provide a work-clamp which, in addition to gripping the work around the area to receive the desired group of stitches, is designed to spread or stretch the work in the plane thereof so that the portion of the work to receive the stitches will lie smooth, flat and taut during the sewing operation.

In some machines, this result is accomplished by longitudinally dividing the work-clamp into two sections, each of which includes a lower work-supporting plate and an upper clamping foot, and by providing means to move these sections laterally after the two clamp-sections are closed upon the work. In other machines, the work-clamps of which are not longitudinally divided, the upper clamp-foot is provided with toothed work-stretching members which engage the work before the clamp-foot is fully closed upon the work and are moved laterally to stretch the work by the clamp-closing motion of the foot. This type of stretching work-clamp has the undesirable characteristic that the work-stretching means are moved laterally before they have firmly gripped the work and hence slip more or less relative to the work. The longitudinally divided type of work-clamp is relatively expensive to build and does not lend itself readily to the incorporation of the usual needle-thread trimmer commonly mounted on the upper work-clamping foot of the non-divided type of work-clamp.

The present invention has for an object to provide an improved work-clamp of the non-divided type including means operative to stretch the work after the clamp has first been fully closed upon the work.

Another object of the invention is to provide the work-clamp with work-stretching means which is of a compensating nature adapting itself to inequalities in the thickness of the work.

Still further, the invention has for an object to provide an improved stretching work-clamp of the type having a work-gripping foot opposed to a stationary work-supporting plate and movable relative to said plate to feed the gripped and stretched work relative to the sewing needle of a sewing machine.

With the above and other objects in view, as will hereinafter appear, the invention comprises the devices, combinations, and arrangements of parts hereinafter set forth and illustrated in the accompanying drawings of preferred embodiments of the invention, from which the several features of the invention and the advantages attained thereby will be readily understood by those skilled in the art.

Of the accompanying drawings, Fig. 1 is a right side elevation of a sewing machine of the lock-stitch straight buttonhole type embodying the invention. Fig. 2 is a top plan view of the work-clamp and associated parts of the machine. Fig. 3 is a front end elevation, partly in section, of the work-clamp and associated parts. Fig. 4 is a sectional view substantially on the line 4—4, Fig. 2. Fig. 5 is a sectional view substantially on the line 5—5, Fig. 2. Fig. 6 is a longitudinal vertical section taken centrally of the rectangular work-exposing aperture in the work-clamping foot; the clamp being closed but the work not yet stretched. Fig. 7 is a similar view after the work-stretching means has been operated. Fig. 8 is a bottom plan view of the clamp-foot. Fig. 9 is a top plan view of the work-supporting throat-plate against which the clamp-foot acts to clamp and stretch the work. Fig. 10 is a section on the line 10—10, Fig. 9. Fig. 11 is a perspective view of the mechanism which operates the work-stretcher member of the work-clamp. Fig. 12 is a perspective view of the cross-slide-plate of the machine bearing the throat-plate.

Figs. 13 to 19, inclusive, show a modified form of work-clamp and, of these figures, Fig. 13 is a top plan view of the work clamp. Fig. 14 is a bottom plan view of the clamp-foot. Fig. 15 is a top plan view of the throat-plate or lower work-supporting plate against which the work is clamped by the clamp-foot. Fig. 16 is a longitudinal vertical section on the line 16—16, Fig. 13; the clamp being closed and the work being, as yet, unstretched. Fig. 17 is a section substantially on the line 17—17, Fig. 16. Fig. 18 is a view similar to Fig. 16 but after the work has been stretched. Fig. 19 is a section on the line 19—19, Fig. 18. Fig. 20 is a plan view of a sample of work produced by the machine, and Fig. 21 is a sectional view through the work on the line 21—21, Fig. 20.

The invention, in one form, as illustrated in Figs. 1 to 12, inclusive, is embodied in a sewing machine of the straight buttonhole type having a bed 1 from which rises the standard 2 of the overhanging bracket-arm 3 terminating in the head 4. Mounted in the head 4, on pintles 5, 5, is the laterally vibratory gate 6 carrying the endwise reciprocatory needle-bar 7 fitted with the needle 8 which cooperates with the usual oscillatory shuttle 9 to form zigzag lock-stitches. The shuttle 9 carries the usual bobbin-thread in the bobbin-case 10 and the needle-bar 7 is connected, as usual, by the link 11 to the crank 12 on the main shaft 13 which is journaled in the bracket-arm 3 and is controlled as to its period of operation, by the usual stop-motion device, such as represented in U. S. Patent No. 1,915,910; June 27, 1933; E. B. Allen, et al. The stop-motion device includes the tilting control-lever 14, Fig. 1, which may occupy the full line machine-stopping position or the dotted line machine-running position. The control-lever 14 is shifted by the operator from full line to dotted line position, Fig. 1, to start the machine and, when the predetermined sewing operation is completed, the control-lever 14 is tripped automatically and automatically returned to full line position to stop the machine.

The needle-bar gate 6 is vibrated by the usual connections with the pinion 15 on the main shaft 13. The pinion 15 drives the gear 16 which, through the usual pin-and-star-wheel drive 17, 18, imparts step-by-step rotary motion to the vertical shaft 19 geared at its upper end to impart semi-rotational impulses to the usual needle-bar-vibrating crank-head 20 connected by the linkage 21, 22 to the gate 6; the construction being substantially the same as that represented in U. S. Patent No. 1,864,165; June 21, 1932; E. B. Allen. At its lower end the shaft 19 is connected through suitable gearing to the vertical feed-shaft 23 to the lower end of which is fixed the feed-wheel 24 formed in its upper face with the longitudinal feed-cam groove 25. The feed-wheel 24 makes one complete revolution per sewing cycle, as is common in machines of the present type.

The work-clamp, except as hereinafter specifically described, is constructed substantially in accordance with the disclosure in U. S. Patent No. 1,489,295; Apr. 8, 1924; A. R. Wood. The bed 1 of the machine has cut therein a transverse guideway 26 for the cross-slide-plate 27 which, in the present machine, is fixed against movement in the guideway 26 by shoulder-screws 28 under the head of at least one of which is the clamping washer 29. The present cross-slide-plate 27 has no connection with the feed-wheel 24, as it has no movement in the bed 1 during the cycle of operations.

Mounted, as usual, on the cross-slide-plate 27 is the throat-plate or work-supporting plate 30 formed with the transverse stitch-receiving slot 31 and the longitudinal knife-slot 32 which receives a knife 33 actuated automatically at the close of a cycle of operations by the usual buttonhole-cutting mechanism of machines of the present type, such mechanism being specifically disclosed in U. S. Patent No. 1,936,381; Nov. 21, 1933; H. Corrall et al. It will suffice here to explain that, at the close of a sewing period, the vertical knife-bar 39 receives a quick down-and-up impulse which drives the knife 33 through the work and into the slot 32, cutting the projecting end of waistband material at f, Fig. 20, close to the down and back row of zigzag tacking stitches s formed by the machine. The waistband b comprises two strips of knit goods having their lateral edges inturned and sewed together by the lines of stitches c, d; the lower line of stitches d also serving to secure the waistband to the knitted body e of the garment.

As the present machine is intended to tack and sever the projecting ends of garment waistbands, as indicated in Fig. 20, the present knife 33 is mounted on a carrier lever 35 which is pivotally hung at 36 on the cross-head 37 fixed at 38 to the lower end of the knife-bar 39. The carrier lever 35 includes an upwardly extending arm 40 which is formed with a cam-slot 41 entered by the follower-roller 42 on the stationary pin 43 mounted on the head 4. The cam-slot 41 is so shaped that, in the down-stroke of the knife-bar 39, the knife-carrier lever 35 is swung on its pivot 36 in a direction to shift the knife 33 toward the needle 8, so as to completely sever the projecting end a of the waist-band b close to the doubly stitched row of zigzag tacking stitches s. In its up position the knife 33 is retracted from the needle 8 sufficiently to avoid interference with the reciprocatory and laterally vibratory needle-bar 7, as in the construction disclosed in my copending application, Serial No. 315,305, filed Jan. 24, 1940.

Mounted in guideways 44, 44, in the cross-slide-plate 27 is the longitudinal slide-frame or base-plate 45 of the work-clamp. The base-plate 45 has imparted to it, during a sewing period, step-by-step travelling movements lengthwise of the bed 1, by the usual link 46 and lever-connection 47 with the longitudinal feed-cam groove 25 in the feed-wheel 24. The base-plate 45 carries a lateral extension 48 on which is pivoted at 49 the upper clamp-arm 50 upon which presses the usual clamp-closing spring 51. The clamp-arm 50 includes two spaced forward extensions 52, 53 to the ends of which is secured by ball-headed screws 54' the non-divided or one-piece upper clamp-foot frame 54 having the rectangular stitch-receiving aperture 55 and the serrated fabric clamping ribs or walls 56 at the sides of the aperture 55. The serrated ribs 56 clamp the work against the smooth top surface portions 57, 58 of the work-supporting throat-plate 30 at each side of the knife-slot 32. These smooth surface portions 57, 58 run the entire length of the plate 30 and the work slides along this plate while under the pressure of the clamp-foot 54 during a sewing period. The ball-headed screws 54' permit the clamp-foot 54 to rock upon the supporting arms 52, 53 and adapt itself to the work.

Secured to the upper clamp-arm 50 is a tail-piece 59 which extends under the roller-stud 60 mounted on the rod 61 which is pivotally hung at 62 from the clamp-opening rock-lever 63 which is journaled to rock upon and relative to the usual stop-motion controlled rock-shaft 64 at the side of the bracket-arm standard 2 of machines of the present type, as represented in U. S. Patent No. 1,966,432; July 17, 1934; E. B. Allen et al.

To spread or stretch the work after it is clamped by the serrated wall-portions 56 of the clamp-foot 54 under the full clamping pressure of the spring 51 or, in other words, after the clamp is fully closed upon the work, there is floatingly mounted in and lengthwise of the rectangular stitch-receiving opening 55 of the upper clamp-foot 54, a work-stretching bar 65 carrying end guide screws 66 which pass through vertical slots 67 in the adjacent side wall of the clamp-foot frame 54. The screws 66 do not clamp the work-stretching bar 65 against the adjacent side wall of the clamp-foot frame 54. They permit free vertical movement of the work-stretching bar 65 in the opening 55.

The work-supporting plate 30 is provided with a longitudinally extending groove 68 which is positioned directly under the work-stretching bar 65. After the clamp is fully closed and the work is firmly gripped by the side teeth 56 of the work-clamp foot, the bar 65 is depressed to force the work into the groove 68, as shown in Fig. 3, and thus stretch the work.

To force the bar 65 downwardly to stretch the work there is provided a lever 69 which is pivoted at 70 to the foot-frame 54. The lever 69 is formed at its under side, between its ends, with a rounded knuckle 71 which engages the upper edge of the bar 65 about midway of the length of said bar and thus permits the bar 65 to rock under the knuckle 71 and press equally at its ends upon work of varying thickness.

To operate the lever 69 there is provided a cam-head 72, Figs. 6, 7 and 11, on a rock-shaft 73 which is journaled in a bracket 74 screwed to the upper clamp-arm extension 53. The rock-shaft 73 has fixed to it a finger-piece 75 by which it may be manually manipulated to stretch the work. For automatic operation, there may be fixed to the rock-shaft 73 a depending ball-headed pin 76 which is shifted to stretch the work by the lever 77 fulcrumed at 78 on the bed-bracket 79. The lever 77 is connected by the links 80 and 81 to the tilting stop-motion lever 14. When the lever 14 is shifted from full line position, Fig. 1, to dotted line position to start the sewing mechanism, the lever 77 is swung counterclockwise, Fig. 2, about its fulcrum 78 and the ball-headed pin 76 is pushed forwardly, thereby rocking the shaft 73 to depress the work-stretching bar 65. The joint 82, Fig. 2, between the links 80 and 81 is a pivot-joint carried by a lever 83 which is fulcrumed on the bed 1 at 84. It will be understood that the stop-motion operated link and lever mechanism for operating the work-stretcher does not interfere with hand-operation of the lever 75 to stretch the work. Either may be used without interference one with the other.

When the lever 75 and rock-shaft 73 are turned from the position shown in Fig. 6 to that shown in Fig. 7 to stretch the work, the cam member 72 is shifted to a position directly under the rock-shaft 73 and, consequently, remains in this position until forceably restored to its original position, Fig. 6. The restoration of the parts to the original position shown in Fig. 6 is accomplished by a connection with the conventional clamp-lifting mechanism of the machine. To this end there is pivotally connected at 85 to the cam-head 72 one end of a link 86 the other end of which is connected to one arm of a bell-crank lever 87 which is fulcrumed at 88 on a bracket 89 supported by the upper clamp-arm extension 59. One arm of the bell-crank lever 87 overhangs the thread trimmer release lever 90 which is fulcrumed at 91 on the bracket 89 and has an extension 92 which overhangs the lever 93 which is fulcrumed to turn on and relative to the usual stop-motion-controlled rock-shaft 64, Fig. 5, at the side of the frame standard 2. The lever 93 carries a laterally extending pin 94, Figs. 2 and 5, which, when the clamp is opened, is struck and shifted by the curved edge 95 of the lever 96 rigidly secured to the treadle-operated lever 97 fulcrumed at 98 on the clamp-opening lever 63. When the treadle-operated lever 97 is actuated, it first swings on its fulcrum 98 to engage the pin 94 on the lever 93 and actuate the train of mechanism to restore the work-stretcher 65 to its initial position, shown in Fig. 6. Further movement of the lever 97 causes its extension 99, Fig. 5, to engage under and effect an operation of the lever 63 to open the work-clamp. This treadle-controlled mechanism is substantially the same as that disclosed in U. S. Patent No. 1,966,432; July 17, 1934; E. B. Allen et al.

The undivided or one-piece clamp foot frame 54 is fitted with the usual pivoted needle-thread cutter and nipper blades 100, 101, Figs. 7 and 8, which are operated by mechanism constructed substantially in accordance with the disclosure of U. S. Patent No. 1,839,823; Jan. 5, 1932; A. R. Wood. The thread-cutter operating mechanism is not described herein as it forms no part of the present invention.

According to the modified form of the invention illustrated in Figs. 13 to 19, inclusive, the cross-slide-plate 27 is fitted with a work-supporting throat-plate 102 having the transverse needle-slot 103 and knife-slot 104; the top surface of the throat-plate being ungrooved and otherwise smooth.

The upper clamp-foot frame 105, carried by the upper clamp-arm extensions 52, 53, has the usual rectangular stitch-receiving opening 106, Fig. 14, along the sides of which are the serrated work-gripping walls 107, 108. The serrated work-gripping wall 107 is rigid with the clamp-foot frame 105 but the other serrated work-gripping wall 108 is hinged to the foot-frame 105 on the pin 109, which pin is located substantially directly above the serrated lower edge of the wall 108, so that the clamp-closing pressure of the clamp-closing spring 51, Fig. 1, will have no appreciable tendency to swing the wall 108 about its hinge-pin 109.

Extending laterally from the hinged work-clamp-foot wall 108 is the arm 110 which terminates between two ball-headed screws 111, 111 in the hub of the finger-piece 112 fast on the rock-shaft 73. As in the first described form of the invention, the rock-shaft 73 carries the cam-head 72. In the present form of the invention, the cam-head 72 does not impart work-stretching movements to the hinged wall 108 but cooperates with the leaf-spring 113 to yieldingly retain the rock-shaft 73 in either the unspread position of Figs. 16 and 17, or the spread position of Figs. 18 and 19. The cam-head 72 is connected by the link 86 to the same clamp-lifter-operated unspreading mechanism as in the first described form of the invention. The finger-piece 112 is to be shifted from the position shown in Fig. 16 to that shown in Fig. 18 after the clamp-foot has been lowered onto the work and grips the same under the full pressure of the clamp-closing spring 51.

The invention is not to be understood as limited to the details of construction and relative arrangements of parts shown and described.

Having thus set forth the nature of the invention, what I claim herein is:

1. The combination with a work-support, a work-clamping foot opposed to said work-support, and spring means to close the work-clamping foot upon work resting upon said work-support, of means carried by and movable relative to said work-clamping foot to stretch the work after the work-clamping foot is fully closed upon the latter.

2. A work-clamp comprising a work-supporting plate, a clamp-foot having a work-gripping surface opposed to said plate, an arm carrying said foot, clamp-closing means applied to said arm, feeding mechanism to move said foot and the work thereunder relatively to said work-supporting plate, and means carried by said arm and operative after the clamp is fully closed to stretch the work.

3. A work-clamp comprising a work-supporting plate, a clamp-foot having a work-gripping surface opposed to said plate, an arm carrying said foot, clamp-closing means applied to said arm, feeding mechanism to move said foot and the work thereunder relatively to said work-supporting plate, work-stretching means mounted on said foot, and means to operate said work-stretching means after the clamp is fully closed.

4. A sewing machine work-clamp having a longitudinally grooved one-piece work-supporting plate, a clamp-foot opposed to said work-supporting plate, said foot having a rectangular stitch-receiving aperture, and means at the sides of said aperture to grip work resting upon said plate, a lever supporting said foot, clamp-closing means connected to said lever, means operative after the clamp is fully closed upon the work to stretch the work exposed by said aperture, said last mentioned means including a work-stretching bar disposed in register with the groove in said work-supporting plate and movable relative to said foot to depress a portion of the work into said groove.

5. The combination with a work-supporting plate having a groove therein, of a rectangularly apertured foot having means at opposite sides of the aperture therein to grip work resting upon said plate, a floating work-stretching bar carried by said foot between said work-gripping means and in register with said groove, and means to and depress said bar and a portion of the work thereunder into said groove.

6. A work-clamp having a work-supporting plate and a clamp-foot formed with a rectangularly apertured foot-frame having work-gripping portions at opposite sides of the aperture therein, and a work-stretching element movably mounted on said foot-frame between the work-gripping portions thereof.

7. The combination with a solid, one-piece rectangular work-clamping foot having a work-exposing elongated opening and work-clamping portions along the sides of said opening, of a work-support having surface portions opposed to said work-clamping portions of said foot, said work-support having a recess extending longitudinally thereof between said surface portions and closely adjacent one of the latter, a floating work-stretching blade movable vertically in and relative to said work-clamping foot in register with said recess, means to close the clamping foot upon work resting upon said work-support, and means to depress said blade into said recess to stretch the work after the work-clamping foot is fully closed upon the work, said last-named means engaging said blade between the ends of the latter, so that the blade may rock and equalize the pressure of its end-portions upon the work.

8. A sewing machine work-clamp having a one-piece work-supporting plate, a clamp-foot opposed to said work-supporting plate, said foot having a rectangular stitch-receiving aperture, and means at the sides of said aperture to grip work resting upon said plate, the work-gripping means at one side of said aperture being movable in said foot away from the work-gripping means at the other side of said aperture, a lever supporting said foot, clamp-closing means connected to said lever, and means to move said movable work-gripping means to stretch the work after the clamp is fully closed upon the work.

9. A work-clamp having a one-piece work-supporting plate, a rectangularly apertured work-clamping foot having relatively separable work-gripping means at opposite sides of said aperture, means to fully close said clamp-foot upon work resting upon said plate without spreading said work-gripping means, and means to relatively spread said gripping means after the work-clamp is fully closed upon the work.

10. A work-clamping foot having a one-piece foot section formed with an elongated work-exposing opening and a work-clamping portion at its under side along one side of said opening, a work-clamping section pivotally mounted on said foot section and disposed at the other side of said opening, means to press said foot and its pivotal work-clamping section into clamping engagement with the work, and means to swing said pivotal section on its pivotal axis to stretch the work while said section is exerting its full clamping pressure upon the work.

11. The combination with a sewing machine having a longitudinally grooved smooth surfaced stationary work-supporting plate, of a work-clamp having a lower plate slidable longitudinally of but fixed laterally with relation to said work-supporting plate, a clamp-lever fulcrumed on said lower plate, a clamp-foot carried by said lever and having a rectangular stitch-receiving opening and work-gripping portions at the sides of said opening clampingly opposed to said work-supporting plate, feeding means to move said work-clamp longitudinally of and relative to said work-supporting plate, a work-stretching bar movably carried by said clamp-foot between said work-gripping portions, said bar being disposed in register with the groove in said work-supporting plate, and means to depress said bar into said groove to stretch the work transversely of said stitch-receiving opening.

12. In a sewing machine having a work-supporting plate formed with a needle aperture, a clamp-foot opposed to said work-supporting plate, said foot having a rectangular stitch-receiving aperture and means at the sides of said aperture adapted for cooperation with said plate to grip the work, a lever supporting said foot, clamp-closing means applied to said lever, means to stretch the work after it is gripped under the full pressure of the clamp-closing means, and feeding mechanism to move said foot and the stretched work thereunder relative to said work-supporting plate for the reception of stitches.

ALFRED R. WOOD.

CERTIFICATE OF CORRECTION.

Patent No. 2,268,367.                                  December 30, 1941.

ALFRED R. WOOD.

It is hereby certified that error appears in the printed specification of the above numbered patent requiring correction as follows: Page 4, first column, line 45, claim 5, after "to" insert --engage said bar between the ends of the latter--; and that the said Letters Patent should be read with this correction therein that the same may conform to the record of the case in the Patent Office.

Signed and sealed this 3rd day of March, A. D. 1942.

Henry Van Arsdale,
(Seal)                              Acting Commissioner of Patents.